April 28, 1925.
W. E. PORTER ET AL
1,535,684
AUTOMOBILE CLOCK
Filed May 2, 1924
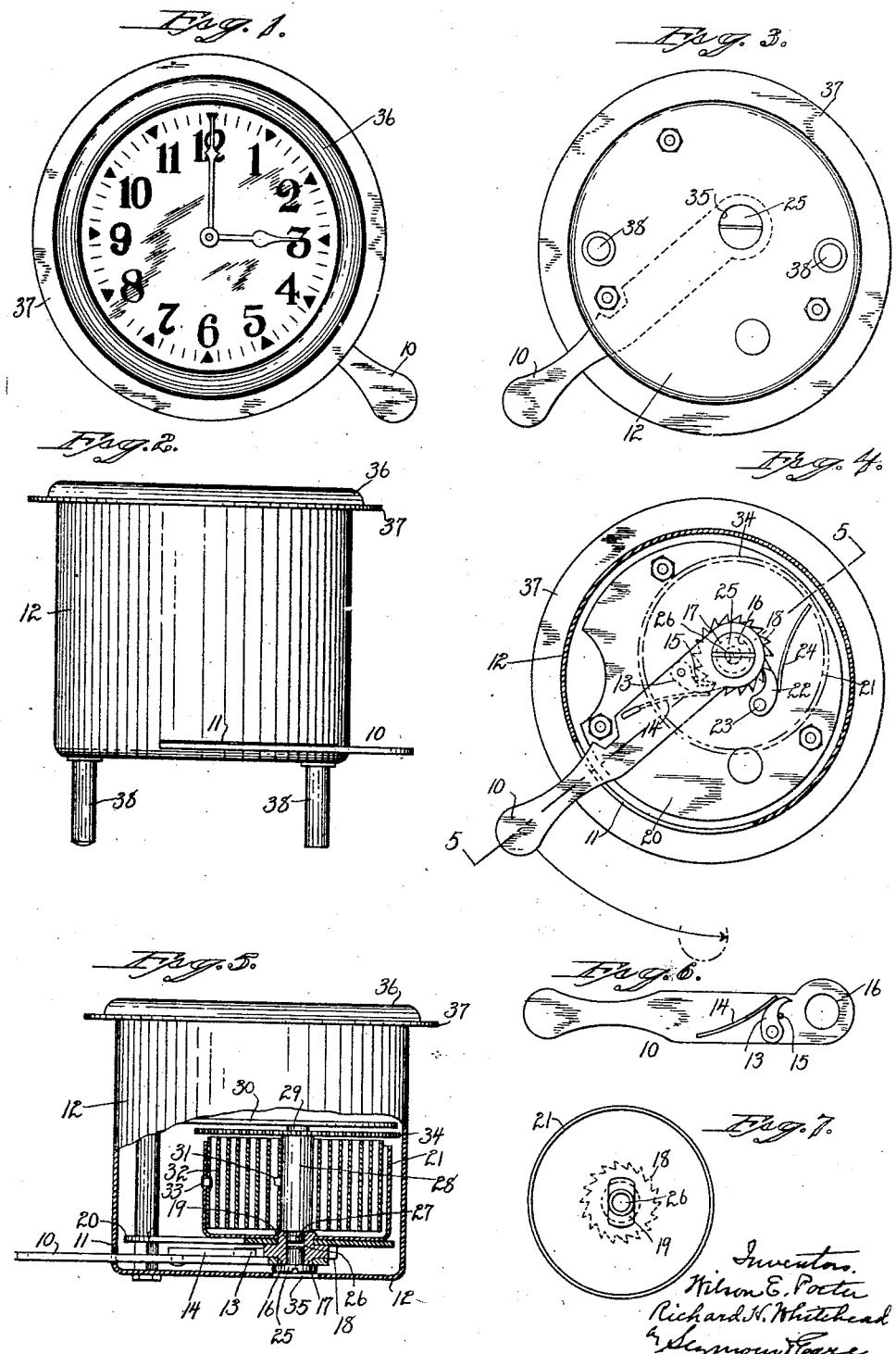

Patented Apr. 28, 1925.

1,535,684

UNITED STATES PATENT OFFICE.

WILSON E. PORTER AND RICHARD H. WHITEHEAD, OF NEW HAVEN, CONNECTICUT, ASSIGNORS TO NEW HAVEN CLOCK CO., OF NEW HAVEN, CONNECTICUT.

AUTOMOBILE CLOCK.

Application filed May 2, 1924. Serial No. 710,517.

*To all whom it may concern:*

Be it known that we, WILSON E. PORTER and RICHARD H. WHITEHEAD, citizens of the United States, residing at New Haven, in the county of New Haven and State of Connecticut, have invented a new and useful Improvement in Automobile Clocks; and we do hereby declare the following, when taken in connection with the accompanying drawings and the characters of reference marked thereon, to be a full, clear, and exact description of the same, and which said drawings constitute part of this application, and represent, in—

Fig. 1 a view in front elevation of an automobile clock embodying our invention.

Fig. 2 a plan view thereof.

Fig. 3 a view thereof in rear elevation.

Fig. 4 a corresponding view, with the back of the clock-case broken away.

Fig. 5 a view of the clock in broken transverse section on the line 5—5 of Fig. 4.

Fig. 6 a detached reverse view of the winding-lever.

Fig. 7 a detached view in inside elevation of the spring-barrel stripped except as to its ratchet-wheel.

Our invention relates to an improvement in automobile clocks, the object being to provide simple, rugged, convenient and speedy means for winding the same, in place of the annular rotary winding-member and gearing therefrom to the spring-arbor, commonly used in automobile clocks.

With these ends in view, our invention consists in a clock provided with a winding-lever projecting from the clock-case in position to be manually operated for winding the main-spring.

Our invention further consists in an automobile clock having certain details of construction and combinations of parts as will be hereinafter described and particularly pointed out in the claims.

In carrying out our invention, as herein shown, we employ a winding-lever 10, the outer end of which projects through a narrow slot 11 close to the rear end of the periphery of an ordinary, cylindrical, sheet-metal clock-case 12. Upon its forward face, the said winding-lever is furnished with a pawl 13 operated by a spring 14. A stop-pin 15, mounted in the lever, prevents the said pawl from being thrown by its spring 14 too far inward when the lever is removed from the clock and handled as a unit. At its inner end the said lever is formed with a bearing-opening 16, adapting it to fit over an annular bearing-shoulder 17 located upon the rear face of and concentric with a ratchet-wheel 18, with which the pawl 13 aforesaid engages. The winding-lever as thus mounted rocks upon an axis coincident with the axis of the said ratchet-wheel, which is provided upon its forward face with an axial mounting-stem 19 extending through a bearing-opening in the rear movement-plate 20 and through an opening in the bottom of the spring-barrel 21, by which the said ratchet-wheel is carried, the said stem having its opposite faces flattened, as shown in Fig. 7, to prevent relative rotation between the wheel 18 and barrel 21, and the inner end of the stem being headed down upon the inner face of the bottom of the barrel, as also shown in Fig. 7. The ratchet-wheel 18 is also engaged by a checking-pawl 22 hung on a pivot 23 in the rear face of the rear movement-plate 20 and pressed by a spring 24 into engagement with the teeth of the wheel, which is, at all times, held against rotation in one direction by the said pawl 22. A screw 25, entering the outer end of the bore 26 of the ratchet-wheel, holds the lever 10 in place upon the bearing-shoulder 17 thereof, as clearly shown in Fig. 5. The opposite end of the bore 26 receives a trunnion 27 formed upon the rear end of the main-spring arbor 28, the forward end of which is formed with a trunnion 29 having bearing in the intermediate movement-plate 30. The said arbor is provided, as usual, with a hook 31 for the attachment to it of the inner end of the main-spring 32, the outer end of which is secured by a rivet 33 to the rim of the spring-barrel 21. The forward end of the arbor 28 carries the main-wheel 34 of a time-train of any approved character, and not necessary to show or describe. As shown, the back of the clock-case is provided with an assembly-opening 35 positioned so as to be concentric with the ratchet 18 when the clock-movement is positioned in the case, as shown by Fig. 5. This assembly-opening 35 provides for the introduction of the screw 25, by means of which the lever 10 is held upon the ratchet 18, after the lever and movement have been separately introduced into the case 12. As shown, the clock-case is provided at its forward end with a bezel 36 and mounting-flange 37, and at its end with two threaded studs 38, but these features have nothing to do with our present invention, which is only concerned with winding the clock by means of a lever.

In winding our improved clock, the winding-lever is grasped by its projecting outer end and moved from right to left, as viewed from the front, or from left to right, as viewed from the rear. At this time, the ratchet-wheel is given a partial turn and the spring-barrel rotated, the pawl 22 now riding over the teeth of the ratchet-wheel. As the lever is swung back in its initial or starting position, the pawl 22 holds the spring-barrel against the action of the main-spring, while the pawl 13, carried by the lever, rides idly back over the ratchet-teeth. In this manner the clock may be wound with great facility. By our invention, we avoid the use of the rotary rings and trains which have heretofore been employed in rotary-wind automobile clocks.

We claim:

1. In an automobile clock, the combination with the main-spring thereof, of a barrel therefor, a ratchet-wheel carried thereby, and having a bearing-shoulder, a rocking winding-lever mounted at its inner end directly upon the said shoulder of the said wheel, a pawl carried by the lever and engaging with the said wheel, and a checking-pawl engaging with the wheel for preventing the reverse movement thereof.

2. In an automobile clock, the combination with the main-spring thereof, of a barrel therefor, a ratchet-wheel carried by the said barrel, a winding-lever rocking upon the said wheel, a pawl carried by the said lever and engaging with the said wheel, a checking-pawl engaging with the said wheel for preventing the reverse movement thereof, and a main-spring arbor journaled at one end in the said wheel, one end of the said main-spring being secured to the said barrel and the other to the said arbor.

3. In an automobile clock, the combination with the main-spring thereof, of a barrel therefor, a ratchet-wheel carried by the said barrel and provided upon one face with a concentric, annular bearing-shoulder and upon its opposite face with a mounting-stem by which it is non-rotatably secured to the barrel, a winding-lever having rocking bearing upon the shoulder of the said wheel, a pawl carried by the said lever and engaging with the said wheel, a checking-pawl engaging with the said wheel for preventing the reverse movement thereof, and a main-spring arbor journaled at one end in the said mounting-stem of the wheel, one end of the main-spring being secured to the said spring-barrel and the other end thereof to the said arbor.

4. In an automobile clock, the combination with a clock-case provided at its rear end with an assembly-opening and with a peripheral slot, of a time-movement having a spring-barrel, a ratchet-wheel carried thereby, and a checking-pawl engaging with the said wheel; a winding-lever adapted to be passed at one end through the peripheral slot of the case, a screw adapted to be entered into the case through the assembly-opening thereof for securing the said lever at its inner end to the said ratchet-wheel upon which it rocks and a pawl carried by the said lever and engaging with the said wheel for winding the said spring.

In testimony whereof, we have signed this specification in the presence of two subscribing witnesses.

WILSON E. PORTER.
RICHARD H. WHITEHEAD.

Witnesses:
CATHERINE A. O'NEIL,
EDWARD I. PETYE.